`US008017685B2`

(12) United States Patent
Choi et al.

(10) Patent No.: US 8,017,685 B2
(45) Date of Patent: Sep. 13, 2011

(54) AQUEOUS POLYURETHANE EMULSION COMPOSITION AND POLYURETHANE FILM USING THE SAME

(75) Inventors: Jin-suk Choi, Seoul (KR); Jin-hong Kim, Seoul (KR); Gook-hee Kim, Seoul (KR); Jum-kyun Lee, Seoul (KR); Myung-chul Jung, Seoul (KR)

(73) Assignee: Dongsung Chemical Co., Ltd., Busan, South Korea (KR)

( * ) Notice: Subject to any disclaimer, the term of this patent is extended or adjusted under 35 U.S.C. 154(b) by 0 days.

(21) Appl. No.: 11/571,979

(22) PCT Filed: Jun. 16, 2005

(86) PCT No.: PCT/KR2005/001844
§ 371 (c)(1),
(2), (4) Date: Jan. 11, 2007

(87) PCT Pub. No.: WO2006/009351
PCT Pub. Date: Jan. 26, 2006

(65) Prior Publication Data
US 2008/0009581 A1 Jan. 10, 2008

(30) Foreign Application Priority Data
Jul. 19, 2004 (KR) .................. 10-2004-0056057

(51) Int. Cl.
*C08G 18/08* (2006.01)
(52) U.S. Cl. ............ 524/589; 2/16; 2/161.7; 427/372.2; 428/423.1; 524/590; 524/591; 524/839; 525/123; 525/131; 528/65
(58) Field of Classification Search ............ 524/589, 524/538, 457, 539, 590, 591, 839; 528/65; 525/123, 131
See application file for complete search history.

(56) References Cited

U.S. PATENT DOCUMENTS

| 3,870,684 | A | * | 3/1975 | Witt et al. | 524/591 |
|---|---|---|---|---|---|
| 5,278,275 | A | * | 1/1994 | Yatsuka et al. | 528/74 |
| 5,997,969 | A | * | 12/1999 | Gardon | 428/35.7 |
| 5,998,540 | A | * | 12/1999 | Lipkin et al. | 524/591 |
| 6,017,997 | A | * | 1/2000 | Snow et al. | 524/591 |
| 6,451,963 | B1 | * | 9/2002 | Langel et al. | 528/480 |
| 6,794,475 | B1 | * | 9/2004 | Bialke et al. | 526/320 |
| 2002/0002227 | A1 | * | 1/2002 | Porter et al. | 524/403 |
| 2002/0028875 | A1 | * | 3/2002 | Anderle et al. | 524/591 |
| 2002/0028877 | A1 | * | 3/2002 | Parks et al. | 524/839 |
| 2003/0119979 | A1 | * | 6/2003 | Zander et al. | 524/591 |
| 2003/0220463 | A1 | * | 11/2003 | Bechara et al. | 528/44 |
| 2004/0116646 | A1 | * | 6/2004 | Choi et al. | 528/66 |
| 2004/0225052 | A1 | * | 11/2004 | Bialke et al. | 524/501 |

FOREIGN PATENT DOCUMENTS

| JP | 53-73294 A | 6/1978 |
|---|---|---|
| JP | 60-219219 A | 11/1985 |
| JP | 62-241902 A | 10/1987 |
| JP | 10-036807 | 2/1998 |
| JP | 11-323300 | 11/1999 |
| JP | 2000-265052 | 9/2000 |
| JP | 2002-145976 A | 5/2002 |
| JP | 2002-275230 | 9/2002 |
| JP | 2002 542321 | 12/2002 |
| JP | 2003-171477 | 6/2003 |
| JP | 2003-533567 | 11/2003 |
| KR | 1999-68101 A | 8/1999 |
| KR | 2001-80694 | 8/2001 |
| WO | WO 9608352 A1 * | 3/1996 |
| WO | WO 99/23129 | 5/1999 |
| WO | WO 00/61651 | 10/2000 |
| WO | WO 00/61653 | 10/2000 |
| WO | WO 01/55237 | 8/2001 |
| WO | WO 01/88007 | 11/2001 |
| WO | WO 01/88024 | 11/2001 |
| WO | WO 02/02657 | 1/2002 |
| WO | WO 03/031491 A1 * | 4/2003 |
| WO | WO 03070811 A1 * | 8/2003 |

OTHER PUBLICATIONS

"Physical Properties", Knovel Solvents—A Properties Database, 2008, ChemTec Publising.*

* cited by examiner

*Primary Examiner* — Mark Eashoo
*Assistant Examiner* — Nicole M Buie-Hatcher
(74) *Attorney, Agent, or Firm* — Swanson & Bratschun, L.L.C.

(57) ABSTRACT

Provided is an aqueous polyurethane emulsion composition having a urethane-urea bond, which is obtained by reacting a polyisocyanate, a polyester polyol and an ionic compound to prepare a polyurethane prepolymer, neutralizing it with an alkali or trialkylamine, dispersing it in water and reacting it with an amine, which is a chain extender. Polyurethane gloves manufactured with the aqueous polyurethane emulsion composition of the present invention have superior antistatic property, which is maintained even after washing, and wearing comfort similar to that of gloves made of natural latex and do not cause allergic reactions.

3 Claims, No Drawings

AQUEOUS POLYURETHANE EMULSION COMPOSITION AND POLYURETHANE FILM USING THE SAME

RELATED APPLICATIONS

This application is a 35 U.S.C. §371 national phase application of PCT/KR2005/001844 (WO/2006/009351), filed on Jun. 16, 2005, entitled "Aqueous Polyurethane Emulsion Composition and Polyurethane Film Using the Same," which application claims priority to Korean Application Serial No. 10-2004-0056057, filed Jul. 19, 2004, each of which is specifically incorporated herein by reference in its entirety.

TECHNICAL FIELD

The present invention relates to an aqueous polyurethane emulsion composition and a polyurethane film using the same. More particularly, the invention relates to an aqueous polyurethane emulsion composition obtained by reacting a polyisocyanate, a polyester polyol and an ionic compound to prepare a polyurethane prepolymer, neutralizing it with an alkali or trialkylamine, dispersing it in water and reacting it with an amine, which is a chain extender, and a polyurethane film using the same.

BACKGROUND ART

Antistatic property is very important in clean rooms. Static electricity causes contamination by dusts and failure and deterioration of electronic devices due to ESD (electrostatic dissipative) discharge. When charged dusts floating in the air approach a charged object, they are attracted by the object due to electrostatic induction and contaminate it. When static electricity charged in the human body or an object is discharged to an electronic device, discharge current passes through the low-resistance region of the device (see Table 1). Heat energy resulting from the current causes such problems as thermal failure of microchips. Particularly, although an operator does not sense the discharge voltage when it is 3.5 kV or below, an electronic device may suffer a severe damage.

As semiconductor products are becoming faster and less power-consuming, wirings and metal electrodes are becoming ever smaller and oxide insulator films are becoming thinner, for the purpose of circuit integration. Resultantly, even heat produced by a small electrostatic discharge current can lead to electrostatic failure of circuits. When a semiconductor product has been completely failed, it may be detected before it is shipped. But, a product slightly deteriorated by relatively small static electricity is hardly detected during shipment inspection.

In order to prevent these severe problems caused by static electricity, a variety of measures are taken, including earthing machines, apparatuses and equipments susceptible to static electricity, using antistatic-treated materials, using conductive materials, humidifying and installing static eliminator.

Especially, an operator wears an antistatic suite, antistatic shoes, antistatic gloves, etc. in order to minimize static electricity caused by the operator. Antistatic gloves are particularly important because they directly contact devices. Wearing antistatic gloves helps prevent contamination of devices and reduce electrostatic failure. Natural rubbers, synthetic rubbers (NBR), polyvinyl chlorides (PVC), etc. are currently used as materials for antistatic gloves. Natural rubber gloves have very poor antistatic property and tend to cause allergic reactions. Synthetic rubbers (NBR) also have insufficient antistatic property and are not completely free from allergic reactions. Polyvinyl gloves may cause contamination of devices because of migration of plasticizers and is disadvantageous in overall properties, including poor antistatic property, mechanical property and wearing comfort. Thus, gloves capable of offering superior antistatic property, wearing comfort, prevention of allergic reactions, mechanical property, etc., compared with the existing gloves, are needed.

TABLE 1

Electrostatic sensitivity of electronic devices

| Device type | ESD voltage range causing failure | |
|---|---|---|
| | Voltage (V) | Energy (µJ) |
| VMOS | 30-1800 | |
| MOSFET | 100-200 | 0.5-2.0 |
| EPROM | 100 | 0.5 |
| JFET | 140-1700 | 0.98-2.45 |
| OP-AMP | 190-2500 | 1.62-312.5 |
| CMOS | 250-3000 | 3.13-450 |
| Schottky diode | 300-2500 | 4.5-312.5 |
| Film register | 300-3000 | 4.5-450 |
| Bipolar transistor | 100-7000 | 4.5-2.45 |
| Schottky TTL | 1000-2500 | 50-312.5 |

Table 2 shows electric property based on surface resistance values according to ASTM D257. If the surface resistance is $10^{12}$ Ω/sq or larger, static electricity tends to form easily because charging is difficult. If the surface resistance is too small, spark may occur. When the surface resistance is $10^{10}$ Ω/sq or smaller, static electricity built up in a body decays almost instantly. When it is about $10^{12}$ Ω/sq, it takes a few seconds for the static electricity to decay, and several minutes at $10^{14}$ Ω/sq. Consequently, the best surface resistance range is from $10^5$ Ω/sq to $10^{10}$ Ω/sq.

TABLE 2

Electric property and surface resistance

| Classification | Surface resistance (in ohms/square) |
|---|---|
| Conducting | $<1 \times 10^3$ |
| Chargeable | $<1 \times 10^{12}$ |
| Insulating | $>1 \times 10^{12}$ |

The present inventors succeeded in manufacturing antistatic gloves using a polyurethane showing physical properties comparable to those of a natural rubber and offering superior antistatic property. Manufacture of polyurethane gloves was disclosed in WO 00/61651 and WO 01/55237. In these patents, polyurethane was synthesized from a polyether polyol by forced emulsification using an external emulsifier, without introducing an ionic group inside the polyurethane. The resultant polyether type urethane gloves have poor hydrophilicity compared with the polyester type. Because an ionic group, which offers hydrophilicity, was not introduced, it has high surface resistance and poor antistatic property, as well as weak hydrophilicity. Although an external emulsifier was introduced to improve hydrophilicity, it is easily washed away by water, differently from the ionic group introduced inside the molecule. Resultantly, antistatic property of the film surface is significantly reduced after washing.

WO 01/88024 disclosed an aqueous polyurethane emulsion prepared by introducing a salt ion, a conductivity inducing material, into a polyether polyol by forced emulsification, in order to improve antistatic property. However, a film prepared using the same does not offer sufficient antistatic property.

DISCLOSURE OF INVENTION

It is an object of the present invention to provide an aqueous polyurethane emulsion composition used to manufacture antistatic polyurethane gloves, which has superior antistatic property, keeps antistatic property even after washing, has wearing comfort comparable to that of natural latex gloves and does not cause allergic reactions.

The above-mentioned object and other objects can be attained by the present invention as described herein below.

CONSTRUCTION OF THE INVENTION

To attain the object, the present invention provides an aqueous polyurethane emulsion composition comprising 1-5 parts by weight of a polyisocyanate, 15-20 parts by weight of a polyester polyol, 0.1-3 parts by weight of an ionic compound, 0.1-1 part by weight of a chain extender, 25-60 parts by weight of water and 0-45 parts by weight of a solvent.

The invention also provides a method of preparing an aqueous polyurethane emulsion composition comprising the steps of: reacting a polyisocyanate, a polyester polyol and an ionic compound to prepare a polyurethane prepolymer; and neutralizing the prepolymer with an alkali or trialkylamine, dispersing it in water and reacting it with an amine, a chain extender.

The invention further provides a polyurethane film prepared from the aqueous polyurethane emulsion prepared by the above method by salt coagulation.

The invention further provides antistatic polyurethane gloves manufacture from the polyurethane film.

Hereinafter, the present invention is described in more detail.

The aqueous polyurethane emulsion composition of the present invention is obtained by reacting a polyisocyanate, a polyester polyol and an ionic compound to prepare a polyurethane prepolymer, neutralizing it with an alkali or trialkylamine, dispersing it in water and reacting it with an amine, which is a chain extender.

The polyisocyanate may be an aromatic polyisocyanate or an aliphatic polyisocyanate. The polyisocyanate is comprised in 1-5 parts by weight, preferably in 2-4 parts by weight, per 100 parts by weight of the composition.

The aromatic polyisocyanate may be selected from the group consisting of 2,4-toluene diisocyanate, 2,6-toluene diisocyanate, 4,4'-methylene diphenyl diisocyanate, 2,4'-methylene diphenyl diisocyanate, polymeric methylene diphenyl diisocyanate, 1,5-naphthaene diisocyanate and a mixture thereof.

The aliphatic polyisocyanate may be selected from the group consisting of 1,6-hexamethylene diisocyanate, isophorone diisocyanate, 4,4'-dicyclohexylmethane diisocyanate, 1,4-cyclohexane diisocyanate, bisisocyanatomethylcyclohexane, tetramethylxylene diisocyanate and a mixture thereof.

The polyester polyol, which reacts with the polyisocyanate to form a prepolymer, is prepared by polymerizing 40-80 parts by weight of a polyfunctional carboxylic acid compound with 40-80 parts by weight of a polyfunctional alcohol compound. The polyester polyol is comprised in 15-20 parts by weight, preferably in 17-19 parts by weight, per 100 parts by weight of the composition.

The polyfunctional carboxylic acid compound may be selected from the group consisting of maleic acid, succinic acid, glutaric acid, adipic acid, pimeric acid, azelic acid, itaconic acid, sebacic acid, chlorendic acid, 1,2,4-butanetricarboxylic acid, phthalic acid, terephthalic acid, phthalic anhydride, isophthalic acid, terephthalic acid, tetrahydrophthalic anhydride, endomethylene, tetrahydrophthalic anhydride and a mixture thereof.

The polyfunctional alcohol compound may be selected from the group consisting of a diol such as ethylene glycol, diethylene glycol, propylene glycol, dipropylene glycol, butanediol, neopentyl glycol and hexanediol; a triol such as glycerine, butanetriol, hexanetriol, trimethylolbutane, trimethylolpentane and trimethanolpropane; a tetraol such as pentaerythrol; and a mixture thereof. The polyester polyol preferably has a molecular weight of 500 to 6,000, more preferably 1,000 to 4,000.

The ionic compound, which offers hydrophilicity to the prepolymer, may be selected from the group consisting of dimethylolpropionic acid, dimethylolbutanoic acid, glyceric acid, thioglyceric acid, tartaric acid, lactic acid, malic acid, dihydroxymalic acid, dihydroxytartaric acid, 2,6-dihydroxybenzoic acid and a mixture thereof. The ionic compound is comprised in 0.1-3 parts by weight, preferably in 0.5-1 part by weight, per 100 parts by weight of the composition.

The amine compound is used to increase molecular weight of the aqueous dispersion after dispersing it in water. The amine, which is a chain extender, may be selected from the group consisting of diethylenetriamine, tris(2-aminoethyl) amine, ethylenediamine, m-xylenediamine, aminoethylethanolamine, hydrazine, hexanediamine and a mixture thereof. The chain extender is comprised in 0.1-1 part by weight, preferably in 0.3-0.8 part by weight, per 100 parts by weight of the composition.

The ionic compound is neutralized before aqueous dispersion. If necessary, it can be neutralized after aqueous dispersion. The alkali or trialkylamine used in the neutralization may be selected from the group consisting of sodium hydroxide, potassium hydroxide, lithium hydroxide, sodium carbonate, sodium bicarbonate, triethylamine, trimethylamine, tripropylamine, dimethylethanolamine and a mixture thereof.

The solvent is used to adjust the viscosity of the prepolymer before dispersion. It may not be used if the viscosity before dispersion is adequate. Preferably, the viscosity before dispersion is 20,000 cps or lower, more preferably 8,000 cps or lower. The solvent may be selected from the group consisting of methyl ethyl ketone, tetrahydrofuran, acetone, toluene, ethyl acetate, dimethylformamide, N-methylpyrrolidone and a mixture thereof. The solvent is comprised in 0-45 parts by weight, preferably in 10-30 parts by weight, per 100 parts by weight of the composition.

The solvent may be removed by a solvent removing process or may not be removed from the aqueous polyurethane emulsion having a urethane-urea bond of the present invention, depending on the use. The resultant aqueous polyurethane emulsion has a particle size of 50 nm to 1,000 nm and a solid content of 10-50 parts by weight.

An aziridine-, epoxy-, oxazoline-, oxazine-, melamine- or carbodiimide-based polyfunctional (having at least two functional groups) one-component crosslinking agent may be added to the aqueous polyurethane emulsion in order to improve waterproofness, solvent resistance, mechanical property, etc. It may not be added if sufficient properties can be obtained without using the crosslinking agent.

Besides, such additives as defoamer, colorant, antioxidant, UV absorber, etc. may be added to the aqueous polyurethane emulsion of the invention.

The present invention also provides polyurethane gloves manufactured from the aqueous polyurethane emulsion by salt agglutination, which is a known glove manufacturing process.

The urethane gloves are manufactured by the salt coagulation process, which is a known latex glove manufacturing process. First, a hand-shaped mold is dipped in a salt solution for 10 seconds to form a thin salt film. Then, the mold in which the salt film has been formed is dipped in a polyurethane dispersion for 20 seconds for salt coagulation. The resultant urethane film is transformed into polyurethane gloves following washing, drying and crosslinking processes.

BEST MODES FOR CARRYING OUT THE INVENTION

Hereinafter, the present invention is described in further detail through examples. However, the following examples are only for the understanding of the invention and the invention is not limited to or by them.

Example 1

In order to prepare a polyurethane prepolymer, 180 g of a polyester polyol (molecular weight=3,000) comprising adipic acid and 1,4-butanediol and 6 g of dimethylolpropionic acid was mixed at 80° C. for 30 minutes and 140 g of diphenylmethane diisocyanate was added. After 10 minutes, viscosity started to increase. 430 g of acetone was added to decrease viscosity. When % NCO decreased below 1% after 4 hours of reaction, temperature of the reactor was reduced to 40° C. and neutralization was performed for 30 minutes by adding 16 g of triethylamine (TEA). Then, 350 g of water was added while strongly stirring at 500 rpm or above. Just after dispersion, 1 g of hydrazine, a chain extender, was added and stirring was performed sufficiently for at least 1 hour. After aqueous dispersion, temperature of the reactor was increased to 50° C. and acetone was removed under reduced pressure. A polyurethane emulsion having a solid content of 40% was obtained.

A film was prepared by the salt agglutination process. A ceramic mold was dipped in 20% $CaCl_2$ solution. After drying at 100° C. for 5 minutes, the mold was dipped in a polyurethane emulsion for 20 seconds. The mold was dried at 100° C. for 10 minutes, immersed in 50° C. of water for 2 minutes. A film was obtained following a crosslinking process at 100° C. for 20 minutes. The result is given in Table 3.

Example 2

The procedure of Example 1 was repeated, except for using a polyester polyol (molecular weight=3,000) comprising adipic acid and 1,6-hexanediol. The result is given in Table 3.

Comparative Example 1

The procedure of Example 1 was repeated, except for using a polypropylene glycol instead of a polyester polyol. The result is given in Table 3.

Comparative Example 2

The procedure of Example 1 was repeated, except for using 8 g of dodecyl sulfonate as external emulsifier instead of DMBA. The result is given in Table 3.

Comparative Example 3

The procedure of Example 1 was repeated, except for using a polypropylene glycol instead of a polyester polyol and 8 g of dodecyl sulfonate as external emulsifier instead of DMBA. The result is given in Table 3.

TABLE 3

|  | Example 1 | Example 2 | Comp. Example 1 | Comp. Example 2 | Comp. Example 3 |
| --- | --- | --- | --- | --- | --- |
| Surface resistance ($\Omega$/sq), before washing | $2 \times 10^8$ | $3 \times 10^8$ | $9 \times 10^9$ | $5 \times 10^9$ | $3 \times 10^{10}$ |
| Surface resistance ($\Omega$/sq), after washing | $5 \times 10^8$ | $5 \times 10^8$ | $2 \times 10^{10}$ | $6 \times 10^{10}$ | $1 \times 10^{11}$ |

As seen in Table 3, the urethane film in which a polyester polyol is used shows better surface resistance before and after washing compared with the urethane film in which a polypropylene glycol is used. Also, though introduction of an internal emulsifier hardly affects surface resistance before and after washing, introduction of an external emulsifier significantly improves surface resistance after washing.

INDUSTRIAL APPLICABILITY

As apparent from the above description, polyurethane gloves manufactured from the aqueous polyurethane emulsion composition of the present invention have superior antistatic property, maintain the antistatic property even after washing, have wearing comfort comparable to that of natural latex gloves and do not cause allergic reactions.

While the present invention has been described in detail with reference to the preferred embodiments, those skilled in the art will appreciate that various modifications and substitutions can be made thereto without departing from the spirit and scope of the invention as set forth in the appended claims.

The invention claimed is:

1. A method for manufacturing an antistatic polyurethane glove comprising the steps of:
    a) reacting 1 to 5 parts by weight of a polyisocyanate, 15 to 20 parts by weight of a polyester polyol and 0.1 to 3 parts by weight of an ionic compound as another polyol to prepare a polyurethane prepolymer;
    b) adding a solvent to the extent that the viscosity of the prepolymer before dispersion is 20,000 cps or below;
    c) neutralizing the polyurethane prepolymer with trialkylamine in a molar amount greater than that of the ionic compound, dispersing it into 25 to 60 parts by weight of water and reacting it with 0.089 to 0.1 part by weight of an amine as a chain extender, to obtain an aqueous emulsion composition of polyurethane;
    d) removing said solvent;
    e) optionally adding a polyfunctional one-component crosslinking agent into the aqueous emulsion composition of polyurethane;
    f) dipping a hand shaped mold into a salt solution and drying it to form a thin salt film thereon;
    g) dipping the hand shaped mold having the salt film into the composition resulting from step d) thereby forming a salt-coagulated mold;
    h) washing, drying and crosslinking the salt-coagulated hand shaped mold; and
    i) transforming said hand shaped mold into a polyurethane glove having a surface resistance after washing within the range from $5 \times 10^8$ $\Omega$/sq to $2 \times 10^{10}$ $\Omega$/sq.

2. The method of claim 1 for manufacturing an antistatic polyurethane glove wherein solvent is added to the extent that the viscosity of the prepolymer before dispersion is 8,000 cps or below.

3. An antistatic polyurethane glove manufactured by the method of claim 1 or 2.

* * * * *